Patented July 21, 1953

2,646,350

UNITED STATES PATENT OFFICE 2,646,350

PETROLEUM HERBICIDE EMULSIONS

Fritz S. Rostler, Bakersfield, Calif., assignor to Golden Bear Oil Co., Los Angeles, Calif., a corporation of California No Drawing. Application June 17, 1950, Serial No. 168,864

8 Claims. (Cl. 71—2.3)

This invention relates to phytocidal emulsions and particularly to herbicidal emulsions, and is particularly directed to employing as the dispersed phase an oil, particularly petroleum oil, in which added phytocidal ingredients are dissolved in the oil phase.

Phytocidal ingredients which are active as herbicides have been suggested for such purposes in the prior art. These include the polynitro-phenols such as di-nitrocresol, polychloro phenols, such as pentachloro phenol, 2,4-dichloro phenoxy acetic acid and its derivatives, usually referred to as 2,4-D preparations, trichloroacetic acid and its derivatives, all of which materials are hereinafter referred to as organic herbicides.

Since because of the high viscosity of the petroleum fraction it is desirable to apply these petroleum solutions of the herbicide in a diluent, and since water is a cheap and expedient diluent, I have found it desirable to employ these organic herbicides in the oil which is emulsified in water.

I have found, however, that unless I employ an oil phase which has a specific gravity greater than one, there is a heavy run-off of the oil phase when the plant is sprayed with the emulsion. Additionally, any emulsion or such low gravity oil present on the leafy part of the vegetation is readily removed if the vegetation is watered as by rain. I have found, however, that if the oil component has a specific gravity greater than one, I obtain a much greater and effective phtyocidal effect.

While I do not wish to be bound by any theory of the improved results obtainable by using such a material, I ascribe the improved effect of the oil ingredients which I employ to its high gravity as well as to phytocidal properties. This I believe results because when the emulsion breaks on contact with the leafy part of the vegetation, the coalesced oil, being of greater gravity than water, sinks to coat the vegetation parts, while the water phase overlies the oil phase. The oil carrying the phytocidal ingredient is thus in direct contact with the vegetation and becomes effective. Any run-off is thus of the water phase, and watering or rain, while it will wash off the water, will not disturb the oil coating as much as would be the case if an oil of gravity less than one were used. In the latter case the oil will float on water and will be separated from the vegetation by a layer of water. It thus floats off and runs off the vegetation. Rain or artificial watering will thus readily wash the oil from the vegetation.

I have also found it desirable to use an oil which has a high solvency for the natural waxes which coat many leafy portions of many forms of vegetation. Such an oil fraction by dissolving and otherwise impairing the waxy layer of the plant permits the phytocidal ingredients to act directly and more effectively. Such an oil also itself has phytocidal effect.

A suitable and highly useful oil fraction which has a specific gravity greater than one and is high in unsaturated components, which thus has a high solvency power for the protective wax components of the plant and contains phytocidal components, is the resinous, unsaturated and naphthenic components of crude petroleum oils.

I have found that there is present in crude oils of the naphthenic, substantially wax-free, type a component or fraction of such viscosity characteristics as to be properly termed resinous. These components of such crude oils are the unsaturated components thereof which have such a large temperature coefficient of viscosity as to be highly viscous or semi-solid at ordinary temperatures, being thermoplastic solids of resinous or resinophoric character and thereby liquid at elevated temperatures. It is a material of honey-like to solid consistency at ordinary atmospheric or at lower temperature, liquid at elevated temperature having the properties of thermoplastic resins, being substantially non-volatile and substantially stable under atmospheric conditions in that it will not change to a hard, brittle product on prolonged exposure to air and sunlight.

Such materials may be isolated from such crude oils by solvent refining of waxy, naphthenic or mixed base oil fractions, either residual or distillates; and by de-waxing procedures, if necessary, I may also obtain those desirable resinous materials by removing them from clays which have been employed in the clay treatment of residual or distilled oil fractions, and which clays carry the resins which they have adsorbed from oils which have been refined by such clays.

I have found that the components of the petroleum oil suited for my invention are the unsaturated, resinous components of the selective solvent extract fraction, preferably of a distillate, produced from a naphthenic base crude, naturally substantially free of solid wax fractions. Many different selective solvents for extraction of such oil have been suggested for the manufacture of lubricating oils, as is evidenced by the art of selective solvent extraction of petroleum oils. Current commercial practice in the lubricating oil industry generally is to use sulfur dioxide, sulfurdioxide-benzol mixture, furfural, or phenol. As is well known, these solvents selectively dissolve the unsaturated naphthenic fraction and other reactive components of the oil (sometimes referred to as aromatic components) to produce an extract, and leave the saturated aliphatic and the saturated naphthenic fractions as the undissolved raffinate. However, the selectivity of the solvents is not sharp, and there may be a substantial quantity of the saturated hydrocarbon fractions dissolved in the extract. This may be minimized, as is well known in the art, by several expedients such as temperature control, solvent to oil ratio, and rejection procedures such as supplementary solvent washes (as with light hydrocarbons), the addition of water, etc.

I have found that solvent extracts (most usefully produced from distillate fractions) containing a preponderant proportion of unsaturated components and but a minor proportion of saturated components, and usefully less than 25% saturated components, preferably less than 15% of saturated components, and, in fact, the lower the percentage of saturated components the better, and substantially free of asphaltic material and wax, reddish in color in bulk, and transparent in thin layers, give the preferred type of resins which have the unique properties and give the unique results described herein.

As an example, and not as a limitation of my invention, extracts having, in addition to the desirable concentration of unsaturated components, the following characteristics are desirable for the purposes of this invention:

Mixed aniline point below about 40° C.; initial boiling point not materially less than 160° C. at 10 mm. Hg; specific gravity in excess of one and preferably not in excess of about 1.05, and more preferably 1.02 to 1.04; viscosity at 25° C., ranging from about 750 centipoises to in excess of 100,000, i. e., 200,000 centipoises or higher viscosities, and a viscosity at 90° C. of about 5–300 centipoises.

Suitable characteristic resins are as follows:

Wherever referred to in this specification, the term saturated components and its per cent content in the fraction, and the terms unsaturated components, Group I, and unsaturated components, Group II, and the per cent content, and the term nitrogen bases and its per cent content, and the term asphaltenes and its per cent content, shall mean, and the per cent content shall mean those determined and defined in "Compounding Rubber With Petroleum Products," by Rostler and Sternberg, published in Industrial and Engineering Chemistry, vol. 41, pp. 598–608, March, 1949.

The mixed aniline point shall be determined on the fraction diluted with equal parts normal heptane by A. S. T. M. Method D 611–46T; the viscosity, the boiling point, and the specific gravity shall be determined by conventional procedure, as will be understood by those skilled in the art.

I have found that these components will have the desired gravity in excess of one, will be highly phytocidal and will have the necessary solvency power for the organic herbicides. If the saturated components of the oil are in excess of about 25%, or if I use a substantially saturated petroleum fraction, I have found that the gravity of the oil will be less than one and the oil will have an insufficient solvency power for the organic herbicide and will be inherently of low phytocidal characteristics.

I have also found that the preferred resins, when suitably emulsified, will produce stable emulsions in that such stable emulsions may be produced from oils containing the necessary concentration of dissolved herbicides such as are desirable for herbicidal applications.

I have found that for the purposes of my invention the emulsion should preferably have the following characteristics. It should be light yellow in color and be free-flowing, containing dispersed semi-liquid, resinous petroleum bodies in amount not materially in excess of 75 parts by weight and water not less than 25 parts by weight. When resin is much in excess of 75 parts by weight, I find that the emulsion is frequently too pasty, but if the ratio of the resin to water

PHYSICAL CHARACTERISTICS

|  | Example 1 | Example 2 | Example 3 | Example 4 | Example 5 |
|---|---|---|---|---|---|
| Initial boiling point | 160° C. at 10 mm. Hg. | 180° C. at 10 mm. Hg. | Above 200° C. at 10 mm. Hg. | Above 220° C. at 10 mm. Hg. | 180° C. at 10 mm. Hg. |
| Flash point | Above 250° C. | Above 250° C. | Above 250° C. | Above 250° C. | Above 250° C. |
| Mixed aniline point (50:50 n-Heptane) | 33.5° C. | 32.4° C. | 32.5° C. | 33° C. | 40° C. |
| Viscosity at 25° C. (cps.) | 12,000 | 800 | >100,000 | 100,000 | 40,000. |
| Viscosity at 90° C. (cps.) | 30 | 10 | 100 | 90 | 40. |
| Specific gravity | 1.02 | 1.01 | 1.04 | 1.03 | 1.01. |

The color of Examples 1, 2, 3, and 4 was reddish-brown, transparent in thin layers. The color of Example 5 was light yellow.

is less than 1:1, i. e., 50 parts resin and 50 parts water, or a greater ratio of water to resin is employed, then the emulsions tend to stratify

CHEMICAL COMPOSITION

|  | Example 1 | Example 2 | Example 3 | Example 4 | Example 5 |
|---|---|---|---|---|---|
|  | Percent | Percent | Percent | Percent | Percent |
| Saturated hydrocarbons | 10.8 | 15.7 | 6.9 | 6.0 | 13.5 |
| Unsaturated hydrocarbons, Group I | 15.5 | 13.9 | 18.9 | 23.8 | 27.8 |
| Unsaturated hydrocarbons, Group II | 55.0 | 58.0 | 47.1 | 45.7 | 58.0 |
| Nitrogen bases | 18.7 | 12.4 | 27.1 | 24.5 | 0.7 | into a water layer and more concentrated but stable emulsion layer, and they become bulky due to excess water, which adds to the cost of storage and transportation. I have found that for purposes of stability and economy the range of 57 to 63 parts by weight of resin and 37 to 43 parts by weight of water with emulsifier and organic herbicide in addition is the most practical and desirable range. However, where the emulsion is not to be stored or transported for long distance, where remixing of the stratified emulsion is not objectionable, the emulsion may be more diluted in resin phase, as described below. The resinous petroleum bodies should have a sufficiently high initial boiling point to give a flash point in excess of 400° F. and have a specific gravity between 1 and 1.05 when measured at 60° F. as compared to water at 60° F. (60°/60°). The emulsion should be stable in the sense that it will not break when stored in clean, closed containers at ordinary temperatures.

Many different emulsifiers may be used for such resins to produce such emulsions. For example, I may use setyl pyridinium chloride; "Duponol G," believed to be fatty alcohol sulfates; "Duponol WA Paste," believed to be principally sulfates of lauryl alcohol; "Oronite Wetting Agent," believed to be petroleum sulfonate; sodium oleate; "Golden Bear Sulfonates"; sodium petroleum sulfonates, constituting the water soluble sodium salts of the sulfonic acids extracted by alcohol in the refining of white oil with sulfuric acid; and bentonite.

This list is not intended to be exhaustive and is but suggestive of the emulsifying agents which may be employed. Many emulsifying agents in the prior art for emulsifying petroleum oils are effective in various concentrations. Those listed above will be found to be useful in concentrations of 5% or less, based on the resin phase.

In addition to the emulsifying agent, stabilizers may be used to stabilize the emulsion against electrolytes which may be present in the water used for making or diluting the emulsion. The use of hard water or water treated with chlorine will require the addition of stabilizers to the emulsion. Stabilizers will also guard against premature breaking of the emulsion by the soil before it has reached the interstices thereof. Such stabilizers include casein, glue, and various gums and synthetic protective colloids and thickeners. Again, it is desirable to use highly active ingredients so that the amount employed may, for practical reasons, be kept to a minimum. These synthetic, highly active stabilizers include, for example: "Cellosize," believed to be hydroxy-ethyl cellulose; "Methocel," believed to be methyl cellulose, the grade preferred for use being 25 centipoises, or one of lower viscosity; "Driscose," or "Hercules CMC," both believed to be sodium carboxy-methyl cellulose; "Vinsol NVX," believed to be the sodium salt of "Vinsol Resin," which is believed to be a dark-colored resin having a specific gravity of about 1.218, a melting point of 234–239° F., largely insoluble in petroleum solvents, and derived from pine wood and containing phenol, aldehyde, and ether groups.

In using the poly-nitro-phenols or polychloro phenols or other organic phytocidal chemicals, such as 2,4-dichloro phenoxy acetic acid and its derivatives (the so-called 2,4-D preparations), or trichloroacetic acid derivatives, I find that since they are readily soluble in the resin phase, I may first incorporate these ingredients into the petroleum resins before forming the emulsion.

Other herbicidal ingredients which are soluble in the oil phase may be used and are classed along with the above ingredients as herbicidal additives for the purposes of this invention. The concentration of such herbicides may be varied up to the solubility limit of the herbicide in the oil phase at ordinary temperatures. The higher the concentration of herbicide in the oil the more effective is the composition and the greater the permissible dilution with water. Thus, I desire to use from a small amount, i. e., less than .1% of the oil phase, up to saturation percentages of the herbicide in the oil phase. Thus, I prepare a 0.5–12.0% solution of the poly-nitro-phenols or polychloro phenols, and form the emulsion in the manner described above.

An example of an emulsion containing pentachloro phenol as the fortifying agent of the emulsion to be used as a general contact weed killer is the following preparation:

*Example 6*

The resinous phase is prepared by dissolving in 100 parts by weight, solvent extract (specific gravity of about 1.04); 6 parts by weight, commercial pentachloro phenol; and 1 part by weight, sodium petroleum sulfonates. The water phase is prepared by dissolving in 67 parts by weight, water; 4.0 parts by weight, sodium petroleum sulfonates; and 0.5 part by weight, Vinsol NVX. The two phases are then mixed and homogenized in a high-speed homogenizing machine.

*Example 7*

Another example of a composition of a commercial weed killer I produce is: Solvent extract (specific gravity 1.02), containing 12% saturated hydrocarbons, 55.8 parts by weight; pentachloro phenol (Santophen 20), 3.6 parts by weight; sodium petroleum sulfonates, 1.8 parts by weight; Vinsol NVX, 0.6 part by weight; water, 38.2 parts by weight.

The emulsion is prepared by dissolving one-half of the sodium petroleum sulfonates and the pentachloro phenol in the resin phase and the other one-half of the sodium petroleum sulfonates and all of the Vinsol NVX in the water. Both phases are then heated to 70–80° C. before emulsification.

The pentachloro phenol content of the above emulsions may be reduced to about 0.5 to 1% of the total weight of the emulsion.

The concentrated herbicidal emulsions as disclosed above in this specification, for practical applications, because of their excellent stability, may be and are in commercial practice usually diluted with water. Thus, for example, they may be diluted to give from .1 to 1% of herbicide, as, for example, one-half per cent pentachloro phenol in the final spray.

The emulsions are characterized by being stable for practically an unlimited period of time if kept in clean, closed containers and if not exposed to extreme temperatures, that is, above freezing or below boiling.

The above examples are given for the purpose of illustrating my invention, not as a limitation thereof.

I have found that the emulsions formulated from the resins as previously described when they contain 25% or less of saturated components and when formulated into emulsions as previously described have the unique properties that they are stable when containing up to 10 to 15% of pentachloro phenol based upon the resin phase.

While I have in the above disclosure listed specific organic herbicides as suitable, other herbicides soluble in the resin phase may be used. For purposes of this invention all such herbicide materials which are soluble in the oil, gravity of at least one, and emulsifiable with water are suitable and are to be classed as an herbicide suitable for use in the herbicide oils or herbicide emulsions of my invention.

The solubility of the oils, and particularly the resinous components specified above, and the emulsifiability thereof in the manner specified above may also be improved by adding to the oil a coupler or mutual solvent for the herbicide and the oil, and for purposes of the emulsion formation it is desirable that the coupler shall have, in addition to lyophilic groupings, hydrophylic groupings as well, and particularly useful are couplers in which the herbicides are themselves soluble.

Thus, for example, I may use the cycloalkanols, for example, cyclohexanol, the higher boiling unsaturated aliphatic alcohols such as the $C_{16}$ to $C_{18}$ alcohols sold as "Ocenol."

Those skilled in this art will be able to select such couplers from the voluminous lists of available organic solvents.

An example of such a solvent especially useful in connection with pentachloro phenol of a formulation of an oil suitable for emulsification containing these materials is as follows:

*Example 8*

100 parts by weight of an oil such as is given in Examples 1 to 4, inclusive; .1 to 30 parts by weight of pentachloro phenol; and up to 100 parts by weight of cyclohexanol, and similar amounts of the Ocenol may be used.

When using high percentages of the coupling agent the gravity of the oil herbicide solution may be reduced to less than 1. In such case I adjust the gravity by adding a high gravity material soluble in the oil phase to raise the gravity to or above 1. A suitable additive for this purpose is carbon tetrachloride ($CCl_4$).

An oil thus formulated may be emulsified in the same manner as the oils previously described to give emulsions of the above compositions and properties.

Instead of preparing the oil as a concentrated emulsion containing water in the ranges specified above, I may prepare the oil as a soluble oil containing the emulsifier and herbicide and so formulated that it may, on mixing with water, be readily emulsified with but a small amount of mechanical agitation.

In such case, however, I find it desirable to increase the concentration of emulsifier above that employed in making the concentrated emulsions as described above, i. e., above 5%, based on the oil phase, and preferably to 8 to 15% by weight, based on the oil phase. I also find it useful, particularly when using pentachloro phenol, to add the coupler described above.

Such an oil is thus not only emulsifiable with water, but may be diluted with many kinds of petroleum oil fractions, such as diesel oil, kerosene, and lubricating oil, preferably, however, maintaining the gravity of the oil phase above one by limiting the addition of the low gravity petroleum oil or by adding a high gravity diluent such as carbon tetrachloride as well. Thus, the oil as prepared above forms a vehicle for high concentrations of herbicide and emulsifier so that they may be diluted and extended to any desired concentration with oil or water. This dilution may be sufficient to reduce the concentration of the herbicide to less than 1%, for example, 0.5%.

While I have described the resinous fraction as the most desirable fraction as having the proper solvency power for the organic herbicides and as having inherently a sufficiently high gravity for the purposes of my invention, I may, by employing a heavy solvent blending agent, impart the desired high gravity to the oil phase where I employ an oil as the carrier for the herbicide which gives an oil phase of gravity less than one. Thus, I may employ a petroleum fraction having a low gravity, due to its boiling point or aliphatic content, or higher gravity petroleum fraction the gravity of which is reduced by the use of a coupling agent, as described above, or a low boiling solvent which aids in dissolving the herbicide in such low gravity oil, by adding to the oil a high gravity diluent which has sufficiently high boiling point so as not to introduce hazards in storage. I may use for this purpose carbon tetrachloride chloro acetyl chloride, o-dichloro benzene, perchloro ethylene, trichlorbenzene, trichlorethane, and bromoform.

These materials may be added in sufficient quantity where needed so that the gravity of the oil phase in the formulated emulsion shall be in excess of one.

While I have described a particular embodiment of my invention for the purpose of illustration, it should be understood that various modifications and adaptations thereof may be made within the spirit of the invention as set forth in the appended claims.

I claim:

1. As a herbicidal composition of matter, an emulsion comprising water as the continuous phase and as dispersed phase, a crude oil component, said component being a resinous petroleum fraction having a flash point above 250° C. substantially free of asphaltenes, containing saturated components in amount not greater than about 25% of the resinous fraction, and having a gravity of at least one, and a herbicide dissolved in said resinous petroleum fraction.

2. As a herbicidal composition of matter, an emulsion comprising water as the continuous phase and as dispersed phase, a crude component, said component being a resinous petroleum fraction having a flash point above 250° C. substantially free of asphaltenes and containing saturated components in amount not greater than about 15% of the resinous fraction, said resinous fraction having a gravity of at least one, and a herbicide dissolved in said resinous petroleum fraction.

3. As a herbicidal composition of matter, an emulsion comprising water as the continuous phase and as dispersed phase, a crude oil component, said component being a thermoplastic resinous petroleum fraction having a flash point above 250° C. and having a viscosity at 25° C. in excess of about 750 centipoises and a specific gravity not less than one and not materially in excess of 1.05 (measured at 60° F.), substantially free of asphaltenes and containing saturated components in amount not greater than about 25% of the resinous fraction, and a herbicide dissolved in said petroleum fraction.

4. As a herbicidal composition of matter, an emulsion comprising water as the continuous phase and as dispersed phase, a crude oil component, said component being a thermoplastic resinous petroleum fraction having a flash point above 250° C. and having a viscosity at 25° C. in excess of about 750 centipoises and a specific gravity not less than one and not materially in excess of 1.05, substantially free of asphaltenes and containing saturated components in amount not greater than about 15% of the resinous fraction, and a herbicide dissolved in said petroleum fraction.

5. A method of controlling the growth of vegetation, which comprises coating said vegetation with an emulsion comprising water as the continuous phase and containing as dispersed phase a crude oil component, said component being a resinous petroleum fraction having a flash point above 250° C. substantially free of asphaltenes, and containing saturated components in amount not greater than about 25% of the resinous fraction, and having a gravity of at least one, and an herbicide dissolved in said resinous petroleum fraction.

6. A method of controlling the growth of vegetation, which comprises coating said vegetation with an emulsion comprising water as the continuous phase and as dispersed phase a crude oil component, said component being a resinous petroleum fraction having a flash point above 250° C. substantially free of asphaltenes, and containing saturated components in amount not greater than about 15% of the resinous fraction, said resinous fraction having a gravity of at least one, and a herbicide dissolved in said petroleum fraction.

7. A method of controlling vegetation, which comprises coating said vegetation with an emulsion comprising water as the continuous phase and as dispersed phase a crude oil component, said component being a thermoplastic resinous petroleum fraction having a flash point above 250° C. and having a viscosity at 25° C. in excess of about 750 centipoises and a specific gravity in excess of one and not materially in excess of 1.05, substantially free of asphaltenes and containing saturated components in amount not greater than about 25% of the resinous fraction, and a herbicide dissolved in said petroleum fraction.

8. A method of controlling the growth of vegetation, which comprises coating said vegetation with an emulsion comprising water as the continuous phase and as dispersed phase a crude oil component, said component being a thermoplastic resinous petroleum fraction having a flash point above 250° C. and having a viscosity at 25° C. in excess of about 750 centipoises and a specific gravity in excess of one and not materially in excess of 1.05, substantially free of asphaltenes and containing saturated components in amount not greater than about 15% of the resinous fraction, and a herbicide dissolved in said petroleum fraction.

FRITZ S. ROSTLER.

References Cited in the file of this patent

UNITED STATES PATENTS

| Number | Name | Date |
|---|---|---|
| 1,946,462 | Hyde et al. | Feb. 6, 1934 |
| 2,160,929 | Warner et al. | June 6, 1939 |
| 2,188,734 | Carswell | Jan. 30, 1940 |
| 2,509,233 | Kaberg et al. | May 30, 1950 |

FOREIGN PATENTS

| Number | Country | Date |
|---|---|---|
| 893,535 | France | July 30, 1944 |

OTHER REFERENCES

Manufacturing Chemist—February 1946, page 70.